US010704617B2

(12) United States Patent
Yoshino et al.

(10) Patent No.: US 10,704,617 B2
(45) Date of Patent: Jul. 7, 2020

(54) POWER TRANSMISSION APPARATUS

(71) Applicant: TOYOTA JIDOSHA KABUSHIKI KAISHA, Toyota-shi, Aichi-ken (JP)

(72) Inventors: Hirotsugu Yoshino, Susono (JP); Hideaki Komada, Gotemba (JP); Yosuke Suzuki, Hadano (JP); Takahito Endo, Shizuoka-ken (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/253,696

(22) Filed: Jan. 22, 2019

(65) Prior Publication Data

US 2019/0234471 A1 Aug. 1, 2019

(30) Foreign Application Priority Data

Jan. 31, 2018 (JP) .................................. 2018-015367

(51) Int. Cl.
*F16D 47/06* (2006.01)
*F16H 3/46* (2006.01)
(Continued)

(52) U.S. Cl.
CPC .............. *F16D 47/06* (2013.01); *B60K 6/387* (2013.01); *F16D 11/14* (2013.01); *F16D 21/00* (2013.01); *F16H 3/006* (2013.01); *F16H 3/46* (2013.01); *F16H 3/728* (2013.01); *F16H 63/304* (2013.01); *F16H 63/3069* (2013.01);
(Continued)

(58) Field of Classification Search
CPC .......... F16D 11/14; F16D 21/00; F16D 47/06; F16D 2011/004; B60K 6/387; B60K 6/365; B60K 6/445; F16H 3/006; F16H 3/46; F16H 3/728; F16H 63/304; F16H 63/3069; F16H 2003/008; F16H 2063/3093;
(Continued)

(56) References Cited

U.S. PATENT DOCUMENTS 9,518,614 B2 * 12/2016 Baur ........................ F16D 11/14
9,770,971 B1 *  9/2017 Oba ......................... B60K 6/365
(Continued)

FOREIGN PATENT DOCUMENTS

DE     102014208794 A1   11/2015
WO     2013/076828 A1     5/2013

*Primary Examiner* — Leslie A Nicholson, III
(74) *Attorney, Agent, or Firm* — Sughrue Mion, PLLC

(57) ABSTRACT

A power transmission apparatus includes a first meshing engagement mechanism that selectively couples a first rotational section and a second rotational section; and a second meshing engagement mechanism that selectively couples a third rotational section and a fourth rotational section. The first meshing engagement mechanism includes a first movable member provided with third meshing teeth that mesh with first meshing teeth provided on one of the first and the second rotational sections. The second meshing engagement mechanism includes a second movable member provided with fourth meshing teeth that mesh with second meshing teeth provided on one of the third and the fourth rotational sections. At least a portion of a first movable region of the third meshing teeth and at least a portion of a second movable region of the fourth meshing teeth overlap with each other in a radial direction with respect to a rotational axis.

6 Claims, 9 Drawing Sheets

(51) Int. Cl.
*F16H 3/00* (2006.01)
*F16D 21/00* (2006.01)
*F16H 3/72* (2006.01)
*F16H 63/30* (2006.01)
*F16D 11/14* (2006.01)
*B60K 6/387* (2007.10)
*B60K 6/365* (2007.10)
*F16D 11/00* (2006.01)
*B60K 6/445* (2007.10)

(52) U.S. Cl.
CPC .............. *B60K 6/365* (2013.01); *B60K 6/445* (2013.01); *F16D 2011/004* (2013.01); *F16H 2003/008* (2013.01); *F16H 2063/3093* (2013.01); *F16H 2200/0021* (2013.01); *F16H 2200/2007* (2013.01); *F16H 2200/2038* (2013.01)

(58) Field of Classification Search
CPC ..... F16H 2200/0021; F16H 2200/2007; F16H 2200/2038
USPC ............................................................ 475/5
See application file for complete search history.

(56) References Cited

U.S. PATENT DOCUMENTS

| | | | |
|---|---|---|---|
| 9,897,187 B2* | 2/2018 | Onitake | F16D 27/108 |
| 10,035,512 B2* | 7/2018 | Ikeya | F16H 63/502 |
| 10,195,930 B2* | 2/2019 | Endo | B60K 6/442 |
| 10,557,537 B2* | 2/2020 | Keeney | B60K 23/08 |
| 2014/0299432 A1 | 10/2014 | Oita et al. | |
| 2017/0146098 A1 | 5/2017 | Ziemer | |

* cited by examiner

POWER TRANSMISSION APPARATUS

INCORPORATION BY REFERENCE

The disclosure of Japanese Patent Application No. 2018-015367 filed on Jan. 31, 2018 including the specification, drawings and abstract is incorporated herein by reference in its entirety.

BACKGROUND

1. Technical Field

The disclosure relates to a power transmission apparatus that includes at least two meshing engagement mechanisms.

2. Description of Related Art

WO 2013/076828 describes an automatic transmission that includes a plurality of engagement mechanisms. One of the engagement mechanisms provided in this automatic transmission is configured as a meshing engagement mechanism. In the meshing engagement mechanism, in order to reduce stress or a surface pressure applied to meshing teeth during torque transmission, the length of each of the meshing teeth needs to be rather long. Accordingly, a movement amount (i.e., a displacement amount) of a movable member at the time of switching from a disengaged state to an engaged state is increased. Similarly, the axial length of an actuator that controls the movable member needs to be increased. Thus, in the case where the meshing engagement mechanism is adopted in the automatic transmission, there is a possibility that the axial length of the automatic transmission becomes long. For this reason, the automatic transmission, which is described in WO 2013/076828, is provided with a one-way clutch that restricts rotation of a second rotary member (a sun gear) in a specified direction with respect to a first rotary member, and the meshing engagement mechanism is disposed inward of the one-way clutch.

SUMMARY

In the automatic transmission described in WO 2013/076828, the meshing engagement mechanism is disposed so as to overlap with another engagement mechanism in an axial direction of an input shaft, and thus, the axial length of the automatic transmission can be reduced. Meanwhile, in the meshing engagement mechanism that can be selectively switched between the engaged state and the disengaged state, meshing teeth on one side slide in an axial direction. Accordingly, it is necessary to secure a movable region of the meshing teeth and a region where the actuator configured to apply an axial load to the meshing teeth is disposed. Thus, the axial length may be increased. That is, there is room for improvement in a technique for providing the plurality of meshing engagement mechanisms, each of which can be selectively switched between the engaged state and the disengaged state, in a power transmission apparatus while the increase in the axial length is reduced.

The disclosure provides a power transmission apparatus in which a plurality of meshing engagement mechanisms can be provided while an increase in axial length thereof is suppressed.

An aspect of the disclosure relates to a power transmission apparatus including a first meshing engagement mechanism that selectively couples a first rotational section and a second rotational section; and a second meshing engagement mechanism that selectively couples a third rotational section and a fourth rotational section. The first rotational section has a cylindrical shape. The second rotational section is disposed concentrically with the first rotational section and has a cylindrical shape having a diameter larger than a diameter of the first rotational section. The third rotational section is disposed concentrically with the second rotational section and has a cylindrical shape having a diameter larger than the diameter of the second rotational section. The fourth rotational section is disposed concentrically with the third rotational section and has a cylindrical shape having a diameter larger than the diameter of the third rotational section. First meshing teeth are provided on one of the first rotational section and the second rotational section. Second meshing teeth are provided on one of the third rotational section and the fourth rotational section. The first meshing engagement mechanism includes a first movable member having a cylindrical shape, the first movable member is provided between the first rotational section and the second rotational section so as to be movable in a direction of a rotational axis of the first rotational section, and the first movable member is provided with third meshing teeth that mesh with the first meshing teeth at a time when the first movable member moves in the direction of the rotational axis. The second meshing engagement mechanism includes a second movable member having a cylindrical shape, the second movable member is provided between the third rotational section and the fourth rotational section so as to be movable in the direction of the rotational axis, and the second movable member is provided with fourth meshing teeth that mesh with the second meshing teeth at a time when the second movable member moves in the direction of the rotational axis. At least a portion of a first movable region along the direction of the rotational axis and at least a portion of a second movable region along the direction of the rotational axis overlap with each other in a radial direction with respect to the rotational axis, the first movable region being a region where the third meshing teeth are movable due to movement of the first movable member, and the second movable region being a region where the fourth meshing teeth are movable due to movement of the second movable member.

In the above aspect of the disclosure, at least a portion of the first movable region along the direction of the rotational axis and at least a portion of the second movable region along the direction of the rotational axis overlap with each other in the radial direction with respect to the rotational axis, the first movable region being a region where the third meshing teeth provided on the first movable member are movable, and the second movable region being a region where the fourth meshing teeth provided on the second movable member are movable. Accordingly, an area for securing at least one of the first movable region and the second movable region can be reduced. In other words, it is possible to prevent a situation where the first movable region and the second movable region are arranged in the axial direction. As a result, the meshing engagement mechanisms can be provided in the power transmission apparatus while an increase in the axial length of the power transmission apparatus is prevented.

In the above-described aspect of the disclosure, an entire region of one of the first movable region and the second movable region may overlap with the other of the first movable region and the second movable region in the radial direction with respect to the rotational axis.

In the above-described configuration, an entire region of one of the first movable region and the second movable region overlaps with the other of the first movable region and the second movable region in the radial direction with respect to the rotational axis. Thus, the increase in the axial length can be prevented.

The power transmission apparatus according to the above-described aspect of the disclosure may further include a first pressing section that is integrated with an outer peripheral surface at one end of the first movable member in an axial direction of the first movable member; a first actuator configured to apply an axial load to a lateral surface at an outer peripheral side of the first pressing section; a second pressing section that is integrated with an outer peripheral surface at one end of the second movable member in an axial direction of the second movable member; and a second actuator configured to apply an axial load to a lateral surface at an outer peripheral side of the second pressing section.

In the above-described configuration, the first pressing section is integrated with the first movable member provided with the third meshing teeth in the axial direction of the first movable member, and the first actuator configured to apply the axial load to the lateral surface at the outer peripheral side of the first pressing section is provided. Similarly, the second pressing section is integrated with the second movable member provided with the fourth meshing teeth in the axial direction of the second movable member, and the second actuator configured to apply the axial load to the lateral surface at the outer peripheral side of the second pressing section is provided. Accordingly, the first movable member and the first actuator can be disposed so as to be offset from each other in the radial direction, and the second movable member and the second actuator can be disposed so as to be offset from each other in the radial direction. As a result, the plurality of meshing engagement mechanisms can be provided in the power transmission apparatus while the increase in the axial length of the power transmission apparatus is prevented. In addition, because arrangement positions of the actuators (i.e., positions at which the actuators are arranged) can be appropriately set, it is possible to improve a degree of freedom in design for providing the plurality of meshing engagement mechanisms in the power transmission apparatus.

In the above-described aspect of the disclosure, the first movable member may be coupled to the second rotational section such that the first movable member is rotated integrally with the second rotational section.

In the above-described configuration, the first movable member and the second rotational section are coupled to each other such that the first movable member and the second rotational section are rotated integrally with each other. Accordingly, in the case where the lateral surface of the first pressing section and an end of the second rotational section come in contact with each other at the time when the first movable member moves to increase a fitting amount of the first movable member and the second rotational section (i.e., a fitting amount by which the first movable member and the second rotational section are fitted to each other) for a purpose of engaging the first meshing teeth and the third meshing teeth with each other or disengaging the first meshing teeth and the third meshing teeth from each other, the power loss can be reduced.

In other words, the lateral surface of the first pressing section and the end of the second rotational section are permitted to contact each other. Accordingly, a region where the first pressing section moves can be set on the side of the second rotational section, and thus the axial length of the power transmission apparatus can be reduced.

In the above-described aspect of the disclosure, the second movable member may be coupled to the fourth rotational section such that the second movable member is rotated integrally with the fourth rotational section.

In the above-described configuration, the second movable member and the fourth rotational section are coupled to each other such that the second movable member and the fourth rotational section are rotated integrally with each other. Accordingly, in the case where the lateral surface of the second pressing section and an end of the fourth rotational section come in contact with each other at the time when the second movable member moves to increase a fitting amount of the second movable member and the fourth rotational section (i.e., a fitting amount by which the second movable member and the fourth rotational section are fitted to each other) for a purpose of engaging the second meshing teeth and the fourth meshing teeth with each other or disengaging the second meshing teeth and the fourth meshing teeth from each other, the power loss can be reduced. In other words, the lateral surface of the second pressing section and the end of the fourth rotational section are permitted to contact each other. Accordingly, a region where the second pressing section moves can be set on the side of the fourth rotational section, and thus the axial length of the power transmission apparatus can be reduced.

In the above-described configuration, the first movable member may be coupled to the second rotational section such that the first movable member is rotated integrally with the second rotational section; the second movable member may be coupled to the third rotational section such that the second movable member is rotated integrally with the third rotational section; the first movable member and the first pressing section may be coupled to each other such that the first movable member and the first pressing section are rotated integrally with each other; the second movable member and the second pressing section may be coupled to each other such that the second movable member and the second pressing section are rotated integrally with each other; the first pressing section and the second pressing section may be arranged in an axial direction of the first rotational section, and the second rotational section and the third rotational section may be configured to rotate integrally with each other.

In the above-described configuration, the first movable member is coupled to the second rotational section such that the first movable member is rotated integrally with the second rotational section, the second movable member is coupled to the third rotational section such that the second movable member is rotated integrally with the third rotational section, and the second rotational section and the third rotational section are configured to rotate integrally with each other. In this case, the power loss can be reduced when the first pressing section and the second pressing section come in contact with each other. Accordingly, a region where the first pressing section moves and a region where the second pressing section moves can be set close to each other, and thus the axial length of the power transmission apparatus can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
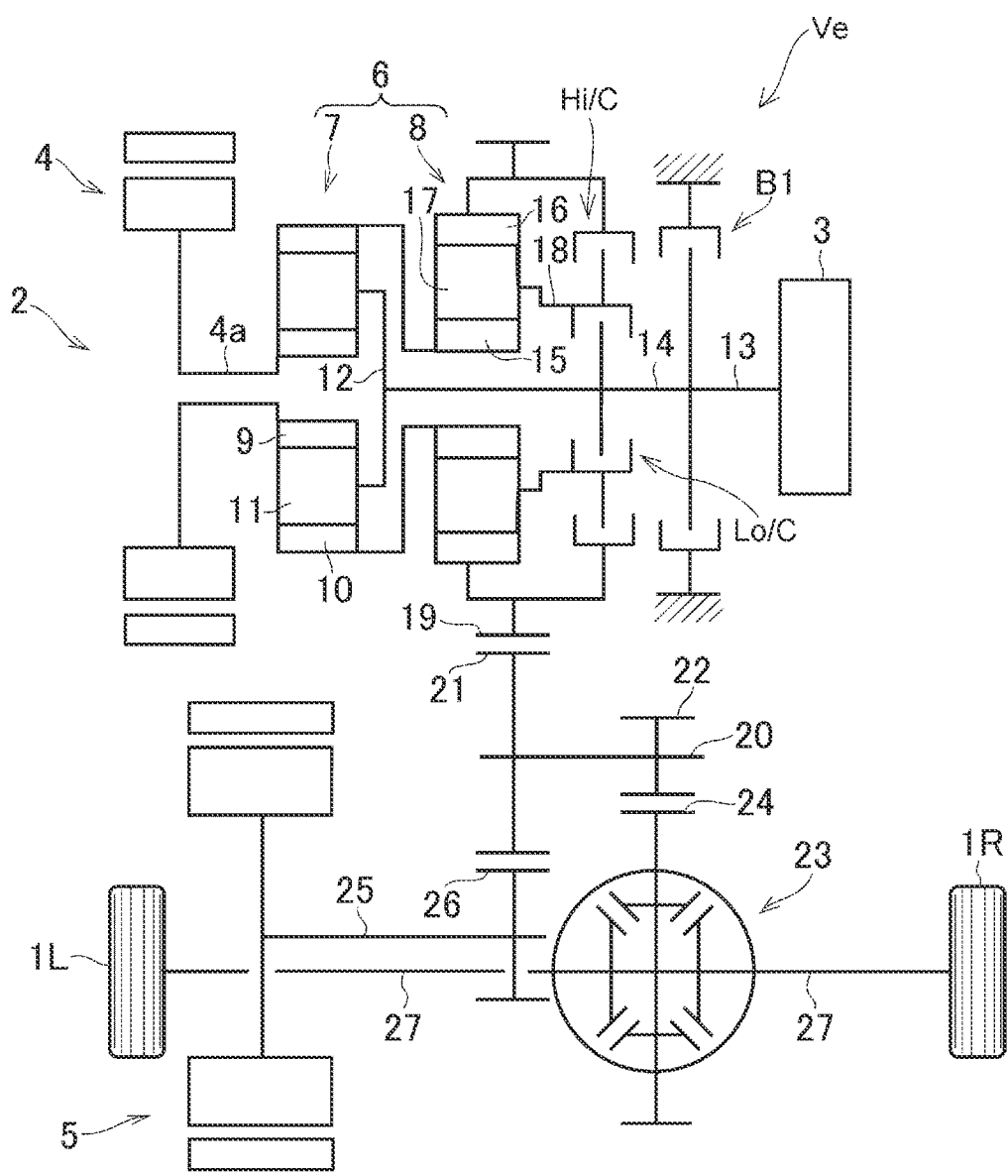
FIG. 1 is a skeletal view for illustrating an example of a vehicle that includes a power transmission apparatus in an embodiment of the disclosure.

A description will be provided on an example of a vehicle that includes a power transmission apparatus in an embodiment of the disclosure with reference to FIG. 1. In the example shown in FIG. 1, a power transmission apparatus 2 that transmits torque from a drive power source to front wheels 1R, 1L is provided in a front portion of a vehicle Ve such that a rotation center shaft of the power transmission apparatus 2 extends in a vehicle width direction. That is, this power transmission apparatus 2 is of a so-called laterally disposed type (i.e., transverse-mounted type), and a more stringent restriction in terms of a length in an axial direction (i.e., an axial length) is imposed on the power transmission apparatus disposed such that the rotation center shaft extends in the vehicle width direction than on a power transmission apparatus disposed such that the rotation center shaft extends in a vehicle longitudinal direction.

This power transmission apparatus 2 is a drive apparatus of a so-called two-motor type that includes an engine 3 and two motors 4, 5 as the drive power sources. The first motor 4 is a motor having an electric power generating function (that is, a motor generator: MG1). A speed of the engine 3 is controlled by the first motor 4, the second motor 5 is driven with the use of the electric power generated by the first motor 4, and drive torque output from the second motor 5 can be added to the drive torque for traveling. Note that the second motor 5 may be a motor having the electric power generating function (that is, a motor generator: MG2).

A power split mechanism 6 is coupled to the engine 3. This power split mechanism 6 is configured to include a split section 7 that has a primary function to split torque output from the engine 3 to the first motor 4-side and an output side; and a speed change section 8 that has a primary function to change a torque split ratio.

The split section 7 may be configured to perform differential action with the use of three rotary elements, and a planetary gear mechanism may be adopted for the split section 7. In the example shown in FIG. 1, the split section 7 is constructed of a planetary gear mechanism of a single-pinion type. The split section 7 shown in FIG. 1 is configured to include a sun gear 9; a ring gear 10 that is an internal gear disposed concentrically with the sun gear 9; a pinion gear 11 that is disposed between the sun gear 9 and ring gear 10 and meshes with the sun gear 9 and the ring gear 10; and a carrier 12 that holds the pinion gear 11 so as to allow rotation and revolution of the pinion gear 11. The sun gear 9 primarily functions as a reaction element, the ring gear 10 primarily functions as an output element, and the carrier 12 primarily functions as an input element.

The carrier 12 is configured to receive the power output from the engine 3. More specifically, an output shaft 13 of the engine 3 is coupled to an input shaft 14 of the power split mechanism 6, and the input shaft 14 is coupled to the carrier 12. Note that, instead of a configuration in which the carrier 12 and the input shaft 14 are directly coupled to each other, the carrier 12 and the input shaft 14 may be coupled via a transmission mechanism such as a gear mechanism. In addition, a mechanism such as a damper mechanism or a torque converter may be disposed between the output shaft 13 and the input shaft 14.

The first motor 4 is coupled to the sun gear 9. In the example shown in FIG. 1, the split section 7 and the first motor 4 are disposed on the same axis as a rotation center axis of the engine 3, and the first motor 4 is disposed on an opposite side of the split section 7 from the engine 3. At a position between the split section 7 and the engine 3, the speed change section 8 is disposed on the same axis as the axis on which the split section 7 and engine 3 are disposed. Thus, the speed change section 8, the split section 7, and the engine 3 are arranged in the direction of the axis.

The speed change section 8 is constructed of a planetary gear mechanism of a single-pinion type. The speed change section 8 includes a sun gear 15; a ring gear 16 that is an internal gear disposed concentrically with the sun gear 15; a pinion gear 17 that is disposed between these sun gear 15 and ring gear 16 and meshes with the sun gear 15 and ring gear 16; and a carrier 18 that holds the pinion gear 17 so as to allow rotation and revolution thereof. The speed change section 8 is a differential mechanism that performs the differential action with the use of three rotary elements, i.e., the sun gear 15, the ring gear 16, and the carrier 18. The ring gear 10 in the split section 7 is coupled to the sun gear 15 in this speed change section 8. In addition, the ring gear 16 in the speed change section 8 is provided with external teeth, and the external teeth are configured to function as an output gear 19.

An Lo clutch mechanism Lo/C is provided so that the split section 7 and the speed change section 8 described above constitute a composite planetary gear mechanism. The Lo clutch mechanism Lo/C is configured to selectively couple the carrier 18 in the speed change section 8 to the carrier 12 in the split section 7 or the input shaft 14. This Lo clutch mechanism Lo/C is constructed of a meshing clutch mechanism that transmits the torque by causing dog clutch teeth to mesh with each other. A detailed configuration of the Lo clutch mechanism Lo/C will be described below.

When this Lo clutch mechanism Lo/C is engaged, the composite planetary gear mechanism is formed. In the composite planetary gear mechanism, the carrier 12 in the split section 7 and the carrier 18 in the speed change section 8 are coupled to each other and function as the input elements, the sun gear 9 in the split section 7 functions as the reaction element, and further the ring gear 16 in the speed change section 8 functions as the output element. That is, the composite planetary gear mechanism is configured to allow differential rotation of the input shaft 14, an output shaft 4a of the first motor 4, and a driven gear 21 that will be described below.

Furthermore, an Hi clutch mechanism Hi/C is provided to integrate all the components of the speed change section 8. This Hi clutch mechanism Hi/C couples at least two rotary elements in the speed change section 8, and the two rotary elements are the carrier 18 and one of the ring gear 16 and the sun gear 15, or the sun gear 15 and the ring gear 16. Similarly to the Lo clutch mechanism Lo/C, the Hi clutch mechanism Hi/C is constructed of a meshing clutch mechanism that transmits the torque by causing the dog clutch teeth to mesh with each other. In the example shown in FIG. 1, the Hi clutch mechanism Hi/C is configured to couple the carrier 18 and the ring gear 16 in the speed change section 8. A detailed configuration of the Hi clutch mechanism Hi/C will be provided below.

The Lo clutch mechanism Lo/C and the Hi clutch mechanism Hi/C are disposed on the same axis as the axis on which the engine 3, the split section 7, and the speed change section 8 are disposed. The Lo clutch mechanism Lo/C and the Hi clutch mechanism Hi/C are disposed on an opposite side of the speed change section 8 from the split section 7. In addition, the clutch mechanisms Lo/C, Hi/C are respectively disposed on an inner peripheral side and an outer peripheral side and are arranged in a radial direction. In this way, the axial length of the entire power transmission apparatus 2 can be reduced. This Lo clutch mechanism Lo/C corresponds to the "first meshing engagement mechanism" in the embodiment of the disclosure, and the Hi clutch mechanism Hi/C corresponds to the "second meshing engagement mechanism" in the embodiment of the disclosure.

A countershaft 20 is disposed in parallel with the rotation center axis of the engine 3 and the split section 7 or the speed change section 8 described above. The driven gear 21 that meshes with the output gear 19 is attached to this countershaft 20. In addition, a drive gear 22 is attached to the countershaft 20, and this drive gear 22 meshes with a ring gear 24 in a differential gear unit 23 as a final reducer. Furthermore, a drive gear 26 that is attached to a rotor shaft 25 in the second motor 5 meshes with the driven gear 21. Accordingly, the power or the torque output from the second motor 5 is added to the power or the torque output from the output gear 19 in the driven gear 21. The power or the torque thus combined is output from the differential gear unit 23 to right and left driveshafts 27 and the power or the torque is thus transmitted to the front wheels 1R, 1L.

Furthermore, the power transmission apparatus 2 is provided with a brake mechanism B1 of a friction type or a meshing type that is configured to be able to selectively fix the output shaft 13 or the input shaft 14 such that the drive torque output from the first motor 4 can be transmitted to the front wheels 1R, 1L. That is, when the output shaft 13 or the input shaft 14 is fixed by the brake mechanism B1, the carrier 12 in the split section 7 or the carrier 18 in the speed change section 8 can function as the reaction element, and the sun gear 9 in the split section 7 can function as the input element. The brake mechanism B1 may generate reaction torque when the first motor 4 outputs the drive torque. Thus, the configuration of the brake mechanism B1 is not limited to the configuration to completely fix the output shaft 13 or the input shaft 14. The brake mechanism B1 may have any configuration as long as the brake mechanism B1 applies the requested reaction torque to the output shaft 13 or the input shaft 14. Alternatively, instead of the brake mechanism B 1, a one-way clutch may be provided to prohibit rotation of the output shaft 13 or the input shaft 14 in a direction opposite to a direction in which the output shaft 13 or the input shaft 14 rotates at the time when the engine 3 is driven.

An HV travel mode and an EV travel mode can be set in the power transmission apparatus 2. In the HV travel mode, the drive torque is output from the engine 3 so as to cause the vehicle Ve to travel. In the EV travel mode, the drive torque is not output from the engine 3 and the drive torque is output from the first motor 4 and/or the second motor 5 so as to cause the vehicle Ve to travel. Furthermore, as the HV travel mode, an HV-Lo mode, an HV-Hi mode, and a direct-coupling mode can be set. In the HV-Lo mode, when the first motor 4 rotates at a low rotational speed (including "0" rotation), the rotational speed of the engine 3 (or the input shaft 14) becomes higher than a rotational speed of the ring gear 16 in the speed change section 8. In the HV-Hi mode, the rotational speed of the engine 3 (or the input shaft 14) becomes lower than the rotational speed of the ring gear 16 in the speed change section 8. In the direct-coupling mode, the rotational speed of the ring gear 16 in the speed change section 8 becomes equal to the rotational speed of the engine 3 (or the input shaft 14).

More specifically, when the Lo clutch mechanism Lo/C is engaged and the drive torque output from the engine 3 is transmitted to the front wheels 1R, 1L, the HV-Lo mode is set. When the Hi clutch mechanism Hi/C is engaged and the drive torque output from the engine 3 is transmitted to the front wheels 1R, 1L, the HV-Hi mode is set. Furthermore, when both of the Lo clutch mechanism Lo/C and the Hi clutch mechanism Hi/C are engaged and the drive torque is output from the engine 3, the direct-coupling mode is set.

As the EV travel mode, a dual mode and a single mode can be set. In the dual mode, the drive torque is output from the first motor 4 and the second motor 5. In the single mode, the drive torque is not output from the first motor 4, and the drive torque is output from only the second motor 5. Furthermore, as the dual mode, an EV-Lo mode and an EV-Hi mode can be set. In the EV-Lo mode, a factor for amplifying the torque output from the first motor 4 is relatively large. In the EV-Hi mode, the factor for amplifying the torque output from the first motor 4 is relatively small.

More specifically, when the Lo clutch mechanism Lo/C and the brake mechanism B1 are engaged and the drive torque is output from the first motor 4, the EV-Lo mode is set. When the Hi clutch mechanism Hi/C and the brake mechanism B1 are engaged and the drive torque is output from the first motor 4, the EV-Hi mode is set. Furthermore, when all of the Lo clutch mechanism Lo/C, the Hi clutch mechanism Hi/C, and the brake mechanism B1 are disengaged, the single mode is set. In the single mode, the vehicle Ve can travel while the engine 3 and the first motor 4 are stopped. Note that, in the single mode, the vehicle Ve may be caused to travel by outputting the drive torque from only the second motor 5 while the Lo clutch mechanism Lo/C is engaged, or the vehicle Ve may be caused to travel by outputting the drive torque from only the second motor 5 while the Hi clutch mechanism Hi/C is engaged.

FIG. 2 to FIG. 7 are collinear diagrams for illustrating the rotational speed of each of the rotary elements in the power split mechanism 6 and directions of the torque of the engine 3 and the motors 4, 5 in the travel modes. In each of the collinear diagrams, straight lines indicative of the rotary elements in the power split mechanism 6 are drawn in parallel with a space representing a gear ratio being interposed therebetween, and a distance from a base line that is orthogonal to these straight lines represents the rotational speed of the corresponding rotary element. The direction of the torque is indicated by an arrow on each of the straight lines indicative of the rotary elements, and a magnitude of the torque is indicated by the length of each of the arrows.

Figure 2:
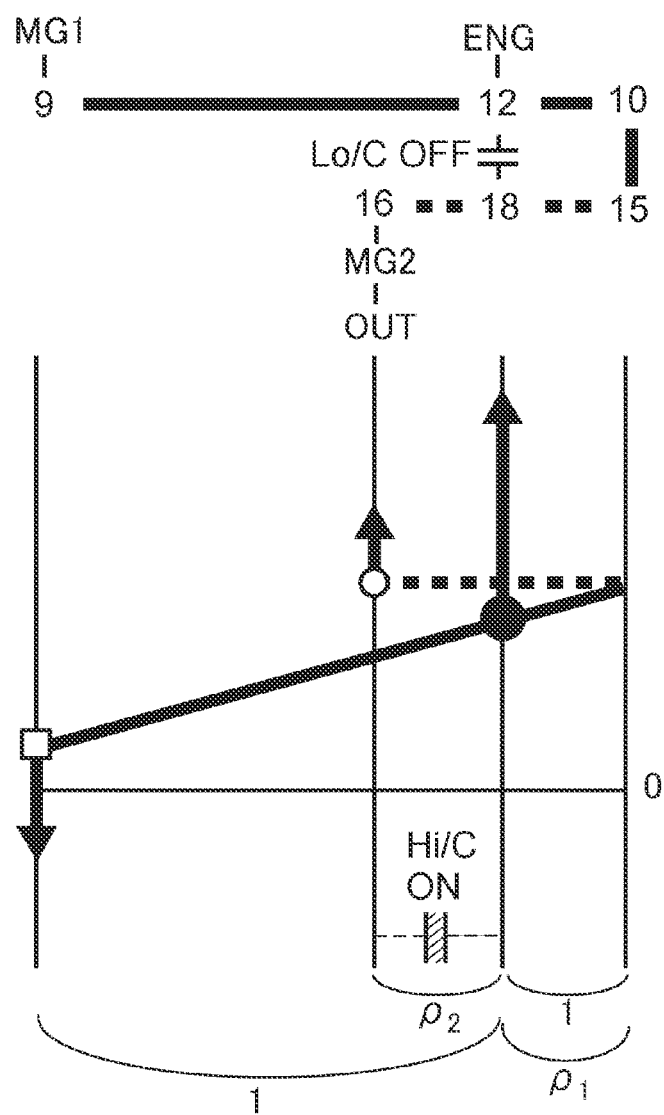
FIG. 2 is a collinear diagram for illustrating an operation state in an HV-Hi mode.
Figure 3:
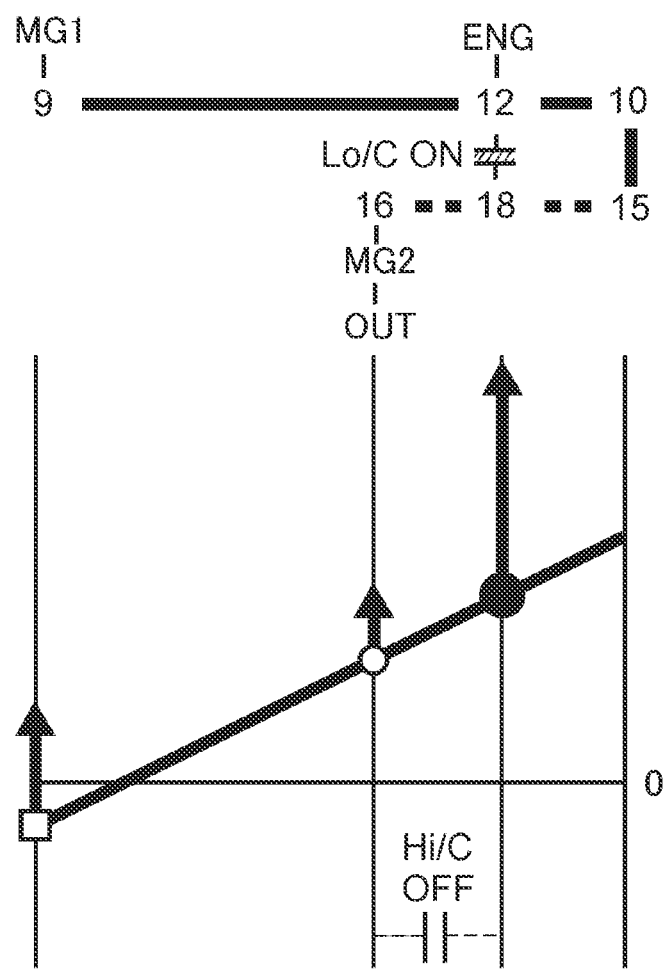
FIG. 3 is a collinear diagram for illustrating the operation state in an HV-Lo mode.

As shown in FIG. 2, in the HV-Hi mode, the drive torque is output from the engine 3, the Hi clutch mechanism Hi/C is engaged, and the reaction torque is output from the first motor 4. As shown in FIG. 3, in the HV-Lo mode, the drive torque is output from the engine 3, the Lo clutch mechanism Lo/C is engaged, and the reaction torque is output from the first motor 4. The rotational speed of the first motor 4 in the HV-Hi mode or the HV-Lo mode is controlled to achieve the optimum efficiency of the entire power transmission apparatus 2 in consideration of fuel economy of the engine 3, drive efficiency of the first motor 4, and the like. The efficiency of the entire power transmission apparatus 2 is a value acquired by dividing a total amount of energy consumed by the engine 3 and the motors 4, 5 by an amount of drive energy acquired from a product of rotational speeds and the torque of the front wheels 1R, 1L. The rotational speed of the first motor 4 described above can be changed continuously, and the engine rotational speed is determined on the basis of the rotational speed of the first motor 4 and a vehicle speed. Thus, the power split mechanism 6 can function as a continuously variable transmission.

Figure 4:
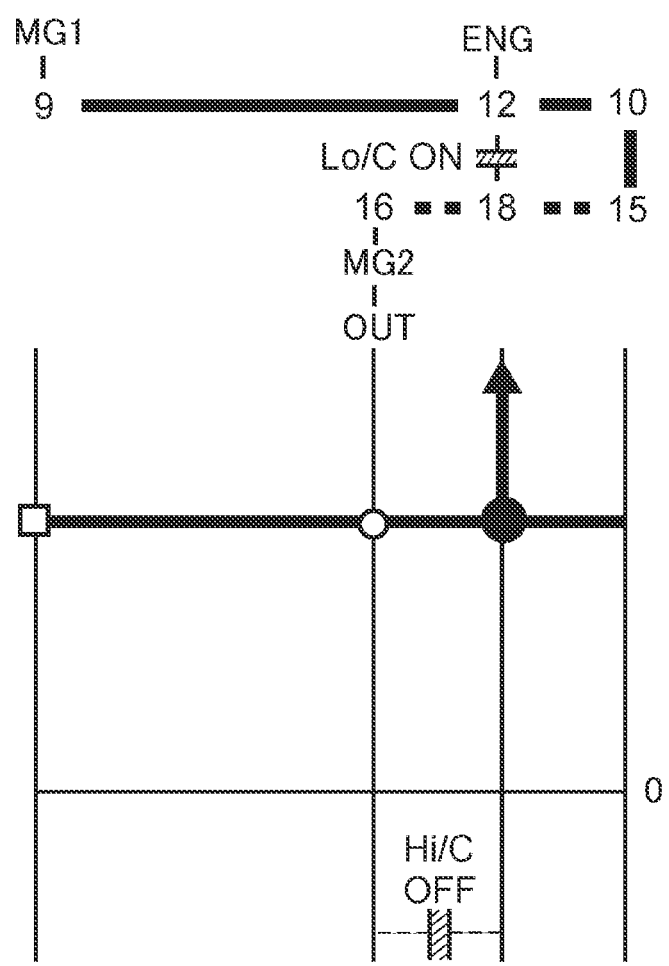
FIG. 4 is a collinear diagram for illustrating the operation state in a direct-coupling mode.

As shown in FIG. 4, in the direct-coupling mode, each of the clutch mechanisms Lo/C, Hi/C is engaged, and thus the rotary elements in the power split mechanism 6 rotate at the same rotational speed. That is, the whole power of the engine 3 is output from the power split mechanism 6.

Figure 5:
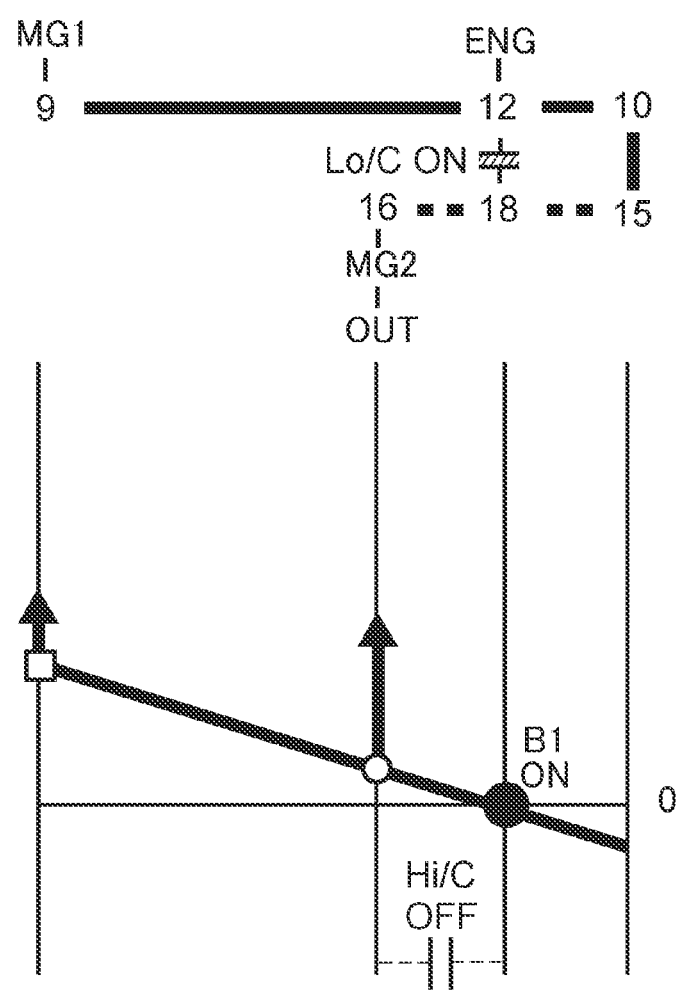
FIG. 5 is a collinear diagram for illustrating the operation state in an EV-Lo mode.
Figure 6:
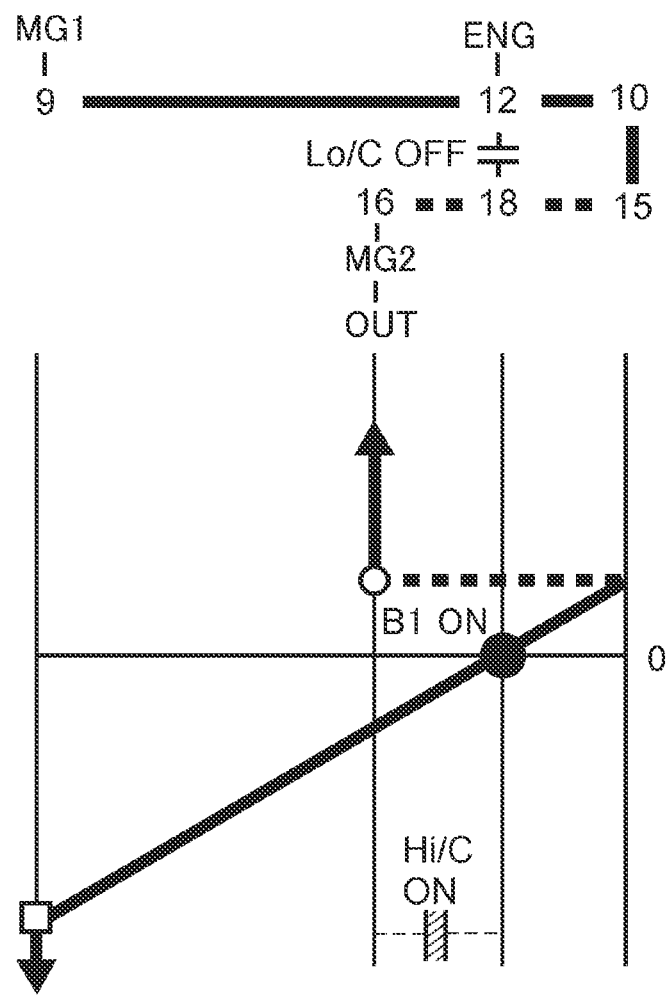
FIG. 6 is a collinear diagram for illustrating the operation state in an EV-Hi mode.
Figure 7:
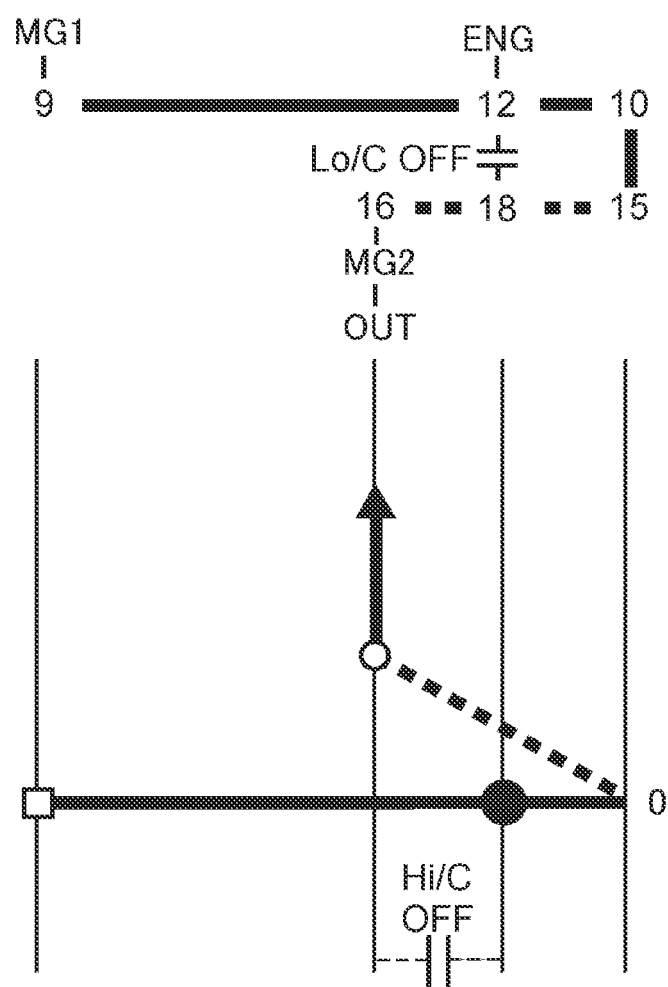
FIG. 7 is a collinear diagram for illustrating the operation state in a single mode.

Furthermore, as shown in FIG. 5 and FIG. 6, in the EV-Lo mode and the EV-Hi mode, the brake mechanism B1 is engaged, the Lo clutch mechanism Lo/C or the Hi clutch mechanism Hi/C is engaged, and the drive torque is output from each of the motors 4, 5 so as to cause the vehicle Ve to travel. As shown in FIG. 5 and FIG. 6, a rotational speed ratio of the rotational speed of the ring gear 16 in the speed change section 8 to the rotational speed of the first motor 4 is lower in the EV-Lo mode than in the EV-Hi mode. That is, a reduction ratio is higher in the EV-Lo mode than in the EV-Hi mode. Accordingly, the high drive power can be acquired by setting the EV-Lo mode. Note that, as shown in FIG. 7, in the single mode, the drive torque is output from only the second motor 5, and both of the clutch mechanisms Lo/C, Hi/C are disengaged, and thus each of the rotary elements in the power split mechanism 6 is brought into the stopped state. Accordingly, power loss due to corotation of the engine 3 or the first motor 4 can be reduced.

Switching among the above-described travel modes is performed in accordance with the requested drive power and/or the vehicle speed. In the case of switching the travel mode in the HV travel mode, for example, the rotational speed of the first motor 4 is controlled to set the direct-coupling mode, and then, the travel mode is switched from the direct-coupling mode to the HV-Hi mode or the HV-Lo mode. Alternatively, after each of the clutch mechanisms Lo/C, Hi/C is disengaged, the rotational speed of the first motor 4 is controlled such that a difference between an input-side rotational speed and an output-side rotational speed of the clutch mechanism to be engaged becomes equal to or smaller than a permissible value. Then, the clutch mechanism is engaged. In the case where the EV travel mode is set, the travel mode can be switched by controlling the first motor 4 and each of the clutch mechanisms Lo/C, Hi/C in the similar manner. Note that, in the case where the state of each of the clutch mechanisms is switched between the engaged state and the disengaged state, the magnitude of the torque applied to meshing surfaces of the clutch mechanism can be controlled by controlling the rotational speed and the torque of the first motor 4. Thus, when controllability of each of the clutch mechanisms is good, rigidity of the members constituting each of the clutch mechanisms can be reduced. That is, the size of each of the clutch mechanisms can be reduced.

Figure 8:
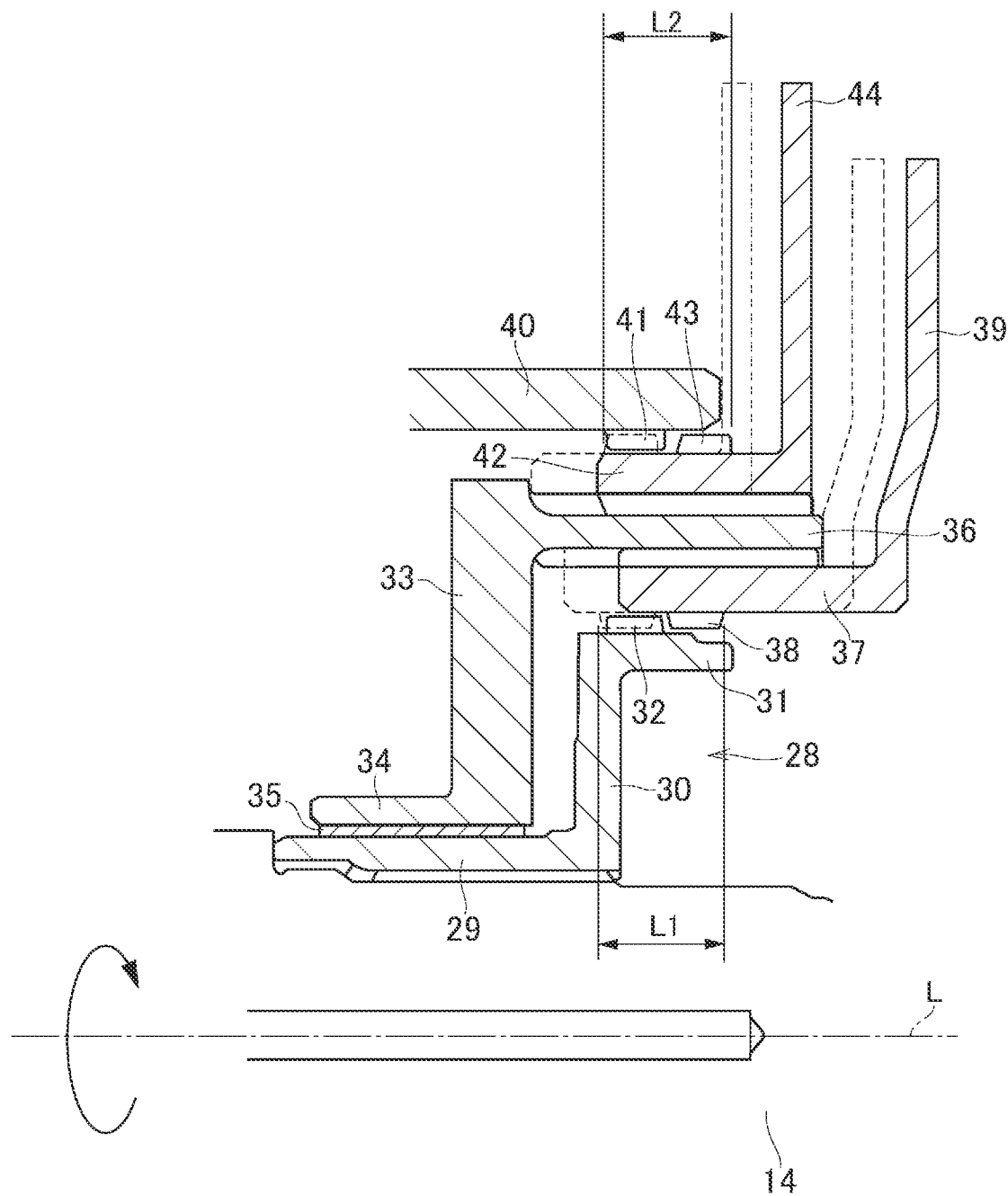
FIG. 8 is a sectional view for illustrating configurations of a Lo clutch mechanism and a Hi clutch mechanism.

As described above, the power transmission apparatus in the embodiment of the disclosure includes the plurality of meshing engagement mechanisms, and makes it possible to improve the mountability of the power transmission apparatus, more specifically, to reduce the axial length of the power transmission apparatus. FIG. 8 is a sectional view for illustrating the configuration of the power transmission apparatus in detail.

In an example shown in FIG. 8, an engaged member 28 is coupled to the input shaft 14. This engaged member 28 is configured to include a cylindrical first hub 29 whose inner peripheral surface is provided with spline teeth; an annular coupled section 30 that is coupled to one end (an end on the engine 3-side) of the first hub 29; and a first cylindrical section 31 that is integrated with an outer peripheral portion of a lateral surface at the engine 3-side of the coupled section 30. This first cylindrical section 31 corresponds to the "first rotational section" in the embodiment of the disclosure. On an outer peripheral surface of the first cylindrical section 31, a portion at the coupled section 30-side in the axial direction is provided with dog clutch teeth 32, each of which has a specified length in the axial direction of the first cylindrical section 31. The dog clutch teeth 32 correspond to the "first meshing teeth" in the embodiment of the disclosure.

Spline teeth are formed on an outer peripheral surface of the input shaft 14, and the spline teeth thereof mesh with the spline teeth formed in the first hub 29. Thus, the engaged member 28 is rotated integrally with the input shaft 14. Note that, in the example shown in FIG. 8, a step is formed in the input shaft 14 to position the first hub 29, and the first hub 29 is fitted to the input shaft 14 such that an end of the first hub 29 contacts the step. In this case, in order to prevent movement of the engaged member 28 in the axial direction of the input shaft 14, a nut or the like that positions an end at the engine 3-side of the first hub 29 may be provided.

The carrier 18 in the speed change section 8 includes an annular first carrier plate (not shown) that is coupled to an end at the split section 7-side of a pinion shaft (not shown) that holds the pinion gear 17; and an annular second carrier plate 33 that is coupled to an end at the engine 3-side of the pinion shaft. A cylindrical second hub 34 is integrally formed in an inner peripheral portion of a lateral surface of the second carrier plate 33, the lateral surface facing toward a side opposite to the engine 3. The second hub 34 is fitted to the first hub 29 via a bush 35. In addition, a second cylindrical section 36 that extends toward the engine 3 beyond the first cylindrical section 31 is integrally formed in an outer peripheral portion of a lateral surface of the second carrier plate 33, the lateral surface facing toward the engine 3, more specifically, at a position radially outward of an outer diameter (an outer periphery) of the first cylindrical section 31. Spline teeth are formed on both of an inner peripheral surface and an outer peripheral surface of the second cylindrical section 36. That is, the second cylindrical section 36 is disposed concentrically with the first cylindrical section 31 and is formed to have a diameter larger than that of the first cylindrical section 31. The second cylindrical section 36 corresponds to the "second rotational section" and the "third rotational section" in the embodiment of the disclosure.

A first movable member 37 having a cylindrical shape is inserted between the first cylindrical section 31 and the second cylindrical section 36. More specifically, spline teeth are formed on an outer peripheral surface of the first movable member 37, and the spline teeth thereof mesh with the spline teeth formed in the inner peripheral surface of the second cylindrical section 36. That is, the first movable member 37 and the second carrier plate 33 are constantly coupled to each other such that the first movable member 37 and the second carrier plate 33 are rotated integrally with each other (i.e., the first movable member 37 and the second carrier plate 33 are rotated together). Furthermore, dog clutch teeth 38, each of which has a specified length in the axial direction, are formed on an inner peripheral surface of the first movable member 37 such that the dog clutch teeth 38 mesh with the dog clutch teeth 32 formed in the first cylindrical section 31 when the first movable member 37 moves toward the second carrier plate 33. The dog clutch teeth 38 correspond to the "third meshing teeth" in the embodiment of the disclosure. Note that the dog clutch teeth 32 formed in the first cylindrical section 31 and the dog clutch teeth 38 formed in the first movable member 37 may have the same length, and the length is determined on the basis of maximum transmission torque determined in design and a permissible value of stress applied to meshing surfaces such that the stress applied to the meshing surfaces becomes equal to or lower than the permissible value when the dog clutch teeth 32, 38 mesh with each other to transmit the torque. In addition, a chamfer is formed on an end at the dog clutch teeth 38-side of each of the dog clutch teeth 32 and an end at the dog clutch teeth 32-side of each of the dog clutch teeth 38 such that the dog clutch teeth 32, 38 can mesh with each other even when phases of the dog clutch teeth 32, 38 in a rotational direction match each other.

Furthermore, a first flange 39 is integrated with an end at the engine 3-side of the first movable member 37. This first flange 39 is provided to transmit an axial load to the first movable member 37. Thus, the configuration may be such that an annular slit is provided on an outer peripheral surface at the engine 3-side of the first movable member 37 and the first flange 39 is disposed in the slit such that the first flange 39 is rotatable relative to the first movable member 37. In addition, in the case where the annular slit is provided in the first movable member 37, a member that presses the first movable member 37 may not have the annular shape unlike the first flange 39. More specifically, for example, a member such as a rod formed to extend in the radial direction may be disposed in the slit such that the member moves integrally with the first movable member 37 in the axial direction. That is, the first flange 39 may be integrated with the first movable member 37 in the axial direction of the first movable member 37. This first flange 39 corresponds to a "first pressing section" in the embodiment of the disclosure.

Moreover, a third cylindrical section 40 that extends toward the engine 3 is integrated with the ring gear 16 in the speed change section 8. This third cylindrical section 40 is formed to have an inner diameter larger than an outer diameter of the second carrier plate 33 and is disposed so as to surround the second carrier plate 33. More specifically, the third cylindrical section 40 is disposed concentrically with the second cylindrical section 36 and is formed to have a diameter larger than that of the second cylindrical section 36. This third cylindrical section 40 corresponds to the "fourth rotational section" in the embodiment of the disclosure. Further, an end at the engine 3-side of the third cylindrical section 40 is located at a position farther from the engine 3 than an end at the engine 3-side of the second cylindrical section 36 is. Furthermore, on an inner surface of the third cylindrical section 40, dog clutch teeth 41 are formed so as to at least partially overlap with the dog clutch teeth 32 formed in the first cylindrical section 31 in an axial direction of a rotation center axis L of each of the cylindrical sections 31, 36, 40. The dog clutch teeth 41 correspond to the "second meshing teeth" in the embodiment of the disclosure. Note that the dog clutch teeth 32 formed in the first cylindrical section 31 may have a length in the axial direction (i.e., an axial length) that is different from the axial length of the dog clutch teeth 41 formed in the third cylindrical section 40. In this case, the dog clutch teeth 32 and the dog clutch teeth 41 may be formed such that the entire dog clutch teeth or the entire spline teeth (for example, the entire dog clutch teeth 32) that are short in the axial direction overlap with the dog clutch teeth (for example, the dog clutch teeth 41) that are long in the axial direction.

A second movable member 42 having a cylindrical shape is inserted between the second cylindrical section 36 and the third cylindrical section 40. More specifically, spline teeth are formed on an inner peripheral surface of the second movable member 42, and the spline teeth thereof mesh with the spline teeth formed on the outer peripheral surface of the second cylindrical section 36. That is, the second movable member 42 and the second carrier plate 33 are always coupled to each other such that the second movable member 42 and the second carrier plate 33 are rotated integrally with each other (i.e., the second movable member 42 and the second carrier plate 33 are rotated together). Furthermore, dog clutch teeth 43, each of which has a specified length in the axial direction, are formed on an outer peripheral surface of the second movable member 42 such that the dog clutch teeth 43 mesh with the dog clutch teeth 41 formed in the third cylindrical section 40 when the second movable member 42 moves toward the second carrier plate 33. The dog clutch teeth 43 correspond to the "fourth meshing teeth" in the embodiment of the disclosure. Note that the dog clutch teeth 41 formed in the third cylindrical section 40 and the dog clutch teeth 43 formed in the second movable member 42 may have the same length, and this length is determined on the basis of the maximum transmission torque determined in the design and a permissible value of the stress applied to meshing surfaces such that the stress applied to the meshing surfaces becomes equal to or lower than the permissible value when the dog clutch teeth 41, 43 mesh with each other to transmit the torque. In addition, a chamfer is formed on an end at the dog clutch teeth 43-side of each of the dog clutch teeth 41 and an end at the dog clutch teeth 41-side of each of the dog clutch teeth 43 such that the dog clutch teeth 41, 43 can mesh with each other even when phases of the dog clutch teeth 41, 43 in the rotational direction match each other.

Furthermore, a second flange 44 is integrated with an end at the engine 3-side of the second movable member 42. This second flange 44 is provided to transmit the axial load to the second movable member 42. Thus, an annular slit is provided on an outer peripheral surface at the engine 3-side of the second movable member 42 and the second flange 44 is disposed in the slit such that the second flange 44 is rotatable relative to the second movable member 42. In addition, in the case where the annular slit is provided in the second movable member 42, a member that presses the second movable member 42 may not have the annular shape unlike the second flange 44. More specifically, for example, a member such as a rod formed to extend in the radial direction may be disposed in the slit such that the member moves integrally with the second movable member 42 in the axial direction. That is, the second flange 44 may be integrated with the second movable member 42 in the axial direction of the second movable member 42. This second flange 44 corresponds to a "second pressing section" in the embodiment of the disclosure.

The configuration shown in FIG. 8 is assembled in the following order. More specifically, initially, the engaged member 28 is engaged with and fixed to the input shaft 14. Thereafter, the bush 35 is fitted to the first hub 29 from a left side (the side opposite to the engine 3) in FIG. 8, and a unit of the speed change section 8 is assembled to the bush 35. More specifically, the second carrier plate 33 is fitted to the bush 35. Thereafter, the second movable member 42 is assembled from the engine 3-side in the axial direction such that the spline teeth formed in the second movable member 42 and the spline teeth formed on the outer peripheral surface of the second cylindrical section 36 mesh with each other. At the time, the dog clutch teeth 41 and the dog clutch teeth 43 do not need to mesh with each other. Subsequently, the first movable member 37 is assembled from the engine 3-side in the axial direction such that the spline teeth formed in the first movable member 37 and the spline teeth formed on the inner peripheral surface of the second cylindrical section 36 mesh with each other. At the time, the dog clutch teeth 32 and the dog clutch teeth 38 do not need to mesh with each other. That is, in the case where the dog clutch teeth 32, 38 are caused to mesh with each other by increasing a fitting amount of the first movable member 37 and the first cylindrical section 31 (i.e., a fitting amount by which the first movable member 37 and the first cylindrical section 31 are fitted to each other), or in the case where the dog clutch teeth 41, 43 are caused to mesh with each other by increasing a fitting amount of the second movable member 42 and the third cylindrical section 40 (i.e., a fitting amount by which the second movable member 42 and the third cylindrical section 40 are fitted to each other), there is no need to, for example, match phases of the movable members 37, 42 at the time of assembly thereof. Thus, the assemblability can be improved, that is, the movable members 37, 42 can be fitted more easily.

Figure 9:
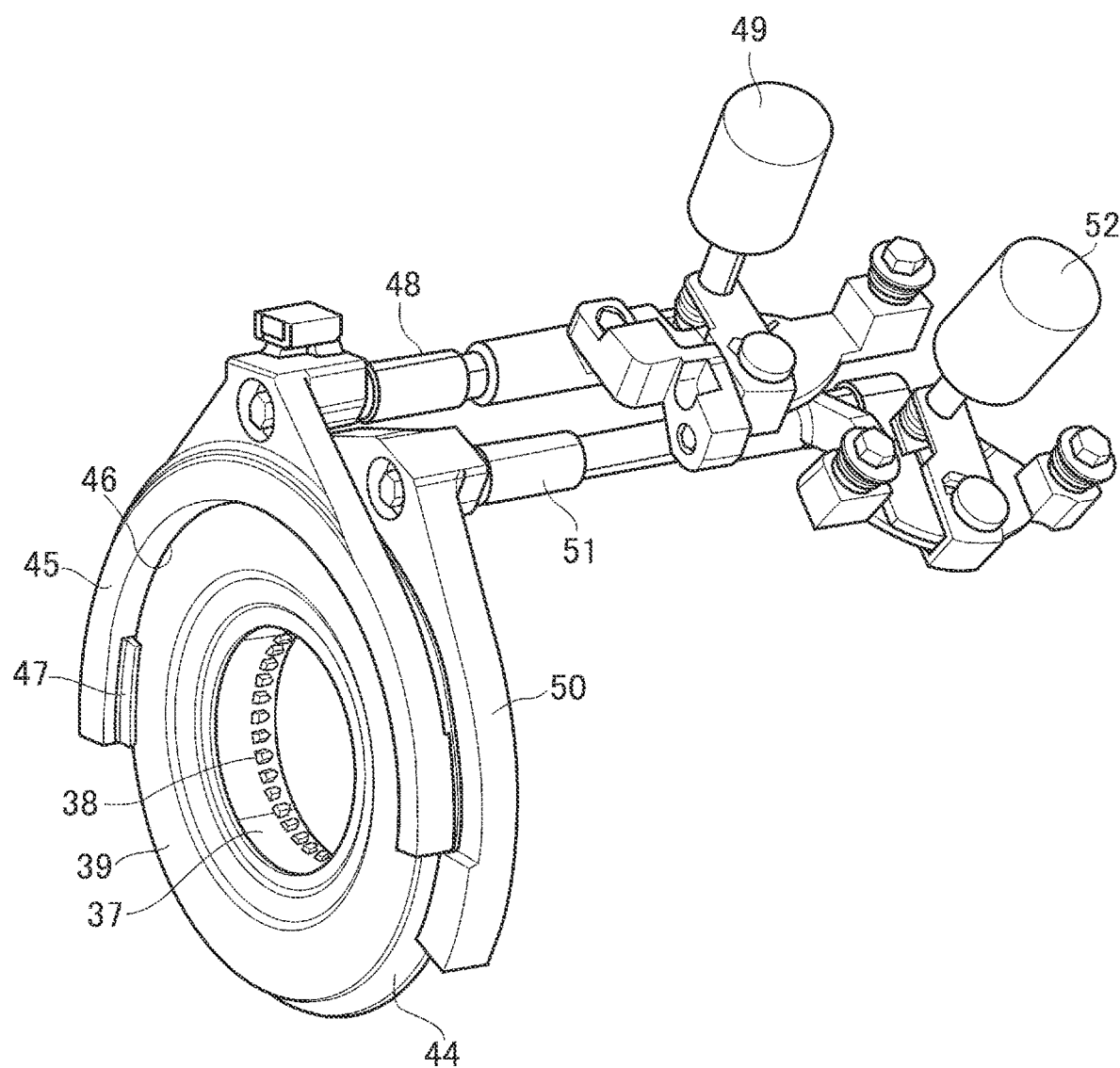
FIG. 9 is a perspective view for illustrating a configuration to apply an axial load to a first flange and a second flange.

As shown in FIG. 9, a semicircular first shift fork 45 is engaged with an outer peripheral surface of the first flange 39. The first shift fork 45 shown in FIG. 9 is formed to have a plate thickness larger than that of the first flange 39, and a groove 46 is formed on an inner peripheral surface of the first shift fork 45. The first flange 39 can slide in the groove 46 in a rotational direction and is locked in the axial direction in the groove 46. An outer periphery of the first flange 39 is disposed in the groove 46. Accordingly, when the first shift fork 45 is pressed in the axial direction, a load thereof is transmitted to the first flange 39. In addition, in an example shown in FIG. 9, a plurality of lugs 47 is formed on the inner peripheral surface of the first shift fork 45 to prevent detachment of the first flange 39 from the groove 46. Note that, in order to reduce sliding resistance between the first shift fork 45 and the first flange 39, a lubricant may be supplied to sliding sections of the first shift fork 45 and the first flange 39 or may cover the sliding sections of the first shift fork 45 and the first flange 39 with a member having a small friction coefficient.

One end of a rod 48 is coupled to a lateral surface at one side of a central portion of the first shift fork 45 in a circumferential direction, via a spring (not shown), the one side being opposite to the engine 3. The rod 48 is provided so as to extend through a case (not shown) that accommodates the power transmission apparatus 2, and an electromagnetic actuator 49 that presses the first shift fork 45 is coupled to the other end of the rod 48 that extends to the outside of the case. The electromagnetic actuator 49 shown in FIG. 9 is configured to include a motor and a cam mechanism that converts torque of the motor to a load of the rod 48 in the axial direction (i.e., an axial load of the rod 48).

Note that, in the case where the ends of the dog clutch teeth 32 and the ends of the dog clutch teeth 38 come in contact with each other when the rod 48 presses the first flange 39, a reaction force applied to the first flange 39 is increased. The above-described spring is provided to prevent a situation where an excessive bending load is applied to the first flange 39 in such a case. In other words, by providing the above-described spring, the rigidity of the first flange 39 can be reduced, that is, the plate thickness of the first flange 39 can be reduced. Accordingly, the axial length of the power transmission apparatus 2 can be further reduced.

With the configuration as described above, when the first shift fork 45 is pulled in a left direction in FIG. 8 by the electromagnetic actuator 49, the load of the first shift fork 45 is transmitted to the first movable member 37 via the first flange 39. As a result, the dog clutch teeth 32 formed in the first cylindrical section 31 and the dog clutch teeth 38 formed in the first movable member 37 mesh with each other. When the first shift fork 45 is pressed by the electromagnetic actuator 49, the load of the first shift fork 45 is transmitted to the first movable member 37 via the first flange 39. As a result, the dog clutch teeth 32 formed in the first cylindrical section 31 and the dog clutch teeth 38 formed in the first movable member 37 are disengaged from each other. That is, the electromagnetic actuator 49, the first shift fork 45, the first flange 39, and the first movable member 37 constitute the meshing engagement mechanism (the Lo clutch mechanism Lo/C).

The Hi clutch mechanism Hi/C is configured similarly to the Lo clutch mechanism Lo/C. That is, a second shift fork 50 that is configured similarly to the first shift fork 45 is coupled to the second flange 44, and a rod 51 and a second electromagnetic actuator 52 that apply the axial load to the second shift fork 50 are provided. Note that, in the example shown in FIG. 9, the first shift fork 45 and the second shift fork 50 are disposed such that phases of the first shift fork 45 and the second shift fork 50 are offset from each other in the rotational direction. The phases of the first shift fork 45 and the second shift fork 50 are offset from each other in the rotational direction in order to prevent interference between a portion of the first shift fork 45, to which the rod 48 is coupled, and a portion of the second shift fork 50, to which the rod 51 is coupled.

The above-described Lo clutch mechanism Lo/C is configured such that the first movable member 37 is located at a position indicated by solid lines in FIG. 8 in the state where the dog clutch teeth 32, 38 are disengaged from each other, that is, in the disengaged state. The Lo clutch mechanism Lo/C is configured such that the first movable member 37 is located at a position indicated by broken lines in FIG. 8 in the state where the dog clutch teeth 32, 38 mesh with each other (i.e., the dog clutch teeth 32, 38 are engaged with each other), that is, in the engaged state. That is, a movable region, in the axial direction, of the dog clutch teeth 38 formed in the first movable member 37 (i.e., a movable region in which the dog clutch teeth 38 are movable in the axial direction) is a range indicated by "L1" in FIG. 8. This movable region corresponds to a "first movable region" in the embodiment of the disclosure.

The Hi clutch mechanism Hi/C is configured such that the second movable member 42 is located at a position indicated by solid lines in FIG. 8 in the state where the dog clutch teeth 41, 43 are disengaged from each other, that is, in the disengaged state. The Hi clutch mechanism Hi/C is configured such that the second movable member 42 is located at a position indicated by broken lines in FIG. 8 in the state where the dog clutch teeth 41, 43 mesh with each other (i.e., the dog clutch teeth 41, 43 are engaged with each other), that is, in the engaged state. That is, a movable region, in the axial direction, of the dog clutch teeth 43 formed in the second movable member 42 (i.e., a movable region in which the dog clutch teeth 43 are movable in the axial direction) is a range indicated by "L2" in FIG. 8. This movable region corresponds to a "second movable region" in the embodiment of the disclosure.

As shown in FIG. 8, the movable region L1 of the dog clutch teeth 38 formed in the first movable member 37 matches the movable region L2 of the dog clutch teeth 43 formed in the second movable member 42. In other words, the movable region L1 and the movable region L2 overlap with each other in a radial direction with respect to a rotational axis L. Accordingly, there is no need to secure ranges in the axial direction for the movable regions L1, L2. In other words, it is possible to prevent a situation where the movable regions L1, L2 are arranged in the axial direction. As a result, even in the case where the two meshing engagement mechanisms are provided in the power transmission apparatus, an increase in the axial length of the power transmission apparatus can be prevented.

In order to achieve the effects, the movable regions L1, L2 do not necessarily need to completely match each other, and at least a portion of the movable region L1 and at least a portion of the movable region L2 may overlap with each other in the radial direction with respect to the rotational axis L. In addition, in the case where the axial length of the dog clutch teeth 32, 38 and the axial length of the dog clutch teeth 41, 43 differ from each other, distances through which the movable members 37, 42 move also differ from each other in accordance with the difference between the axial length of the dog clutch teeth 32, 38 and the axial length of the dog clutch teeth 41, 43. In this case, the entire movable region L2 of the movable member that is movable in a short movable region (for example, the second movable member 42) may overlap with the movable region L1 of the movable member that is movable in a long movable region (for example, the first movable member 37), in the radial direction with respect to the rotational axis L.

As described above, the flanges 39, 44 are respectively coupled to the first movable member 37 and the second movable member 42 and the outer peripheral portions of the flanges 39, 44 respectively receive the loads from the actuators 49, 52. Thus, the position where the dog clutch teeth mesh with each other and the position where a thrust for causing the dog clutch teeth to mesh each other is generated are made different from each other in the radial direction. As a result, the increase in the axial length of the power transmission apparatus 2 can be prevented. Furthermore, because arrangement positions of the actuators 49, 52 (i.e., the positions at which the actuators 49, 52 are arranged) can be appropriately set, it is possible to improve a degree of freedom in design for providing the plurality of clutch mechanisms Lo/C, Hi/C in the power transmission apparatus 2.

The first movable member 37 and the second cylindrical section 36 are coupled to each other such that the first movable member 37 and the second cylindrical section 36 are rotated integrally with each other. Thus, relative rotation of the first flange 39 and the second cylindrical section 36 can be prevented. As a result, even in the case where the lateral surface of the first flange 39 and the end of the second cylindrical section 36 come in contact with each other at the time when the first movable member 37 moves to increase a fitting amount of the first movable member 37 and the second cylindrical section 36 (i.e., a fitting amount by which the first movable member 37 and the second cylindrical section 36 are fitted to each other) for a purpose of engaging the dog clutch teeth 32 and the dog clutch teeth 38 with each other, contact surfaces thereof do not slide. Thus, the power loss can be reduced. Accordingly, there is no need to provide a clearance between the first flange 39 and the end of the second cylindrical section 36 when the dog clutch teeth 32, 38 mesh with each other. Thus, a region where the first flange 39 moves can be set on the side of the second cylindrical section 36. For this reason, there is no need to secure the excessively large region where the first flange 39 moves, and thus the axial length of the power transmission apparatus 2 can be reduced. In addition, the end of the second cylindrical section 36 has a function of positioning the first flange 39. Accordingly, there is no need to provide another positioning mechanism or the like. Thus, the axial length of the power transmission apparatus 2 can be reduced.

Furthermore, as described above, in the case where the HV-Lo mode or the EV-Lo mode is set, the Lo clutch mechanism Lo/C is engaged, and the Hi clutch mechanism Hi/C is disengaged. In this case, in the configuration shown in FIG. 8, the second flange 44 is located on the engine 3-side in the axial direction, and the first flange 39 is located on the side opposite to the engine 3 in the axial direction. That is, the flanges 39, 44 approach each other. Meanwhile, in the configuration shown in FIG. 8, since each of the movable members 37, 42 is coupled to the second cylindrical section 36 such that the movable members 37, 42 and the second cylindrical section 36 are rotated integrally with each other, the flanges 39, 44 are also rotated integrally with each other. Accordingly, even when the flanges 39, 44 come in contact with each other, friction is not generated on contact surfaces thereof, and thus the power loss can be reduced. As a result, there is no need to provide a clearance between the flanges 39, 44 to prevent the contact between the flanges 39, 44 at the time when the flanges 39, 44 move so as to approach each other. In this way, the region where the first flange 39 moves and a region where the second flange 44 moves can be set close to each other, and the axial length of the power transmission apparatus 2 can be reduced.

Note that the first meshing engagement mechanism and the second meshing engagement mechanism in the embodiment of the disclosure may be configured to engage the different rotational sections with each other. More specifically, the first meshing engagement mechanism may be configured to engage the first rotational section with the second rotational section that rotates relative to the first rotational section, and the second meshing engagement mechanism may be configured to engage the third rotational section that rotates relative to the first rotational section and the second rotational section, with the fourth rotational section that rotates relative to the first rotational section, the second rotational section, and the third rotational section. In this case, the cylindrical rotational section, which is disposed on the side of the outer periphery of the second movable member and has the end facing the second flange, constantly meshes with the second movable member. Thus, it is possible to reduce the power loss at the time when the second flange approaches the rotational section, and accordingly the axial length of the power transmission apparatus can be reduced.

The configuration of the Lo clutch mechanism Lo/C is not limited to a configuration in which the dog clutch teeth 32, 38 mesh with each other when the first movable member 37 moves to increase the fitting amount of the first movable member 37 and the second cylindrical section 36. The Lo clutch mechanism Lo/C may be configured such that the dog clutch teeth 32, 38 are disengaged from each other when the first movable member 37 moves to increase the fitting amount of the first movable member 37 and the second cylindrical section 36, and the dog clutch teeth 32, 38 mesh with each other when the first movable member 37 moves to reduce the fitting amount of the first movable member 37 and the second cylindrical section 36. Similarly, the configuration of the Hi clutch mechanism Hi/C is not limited to a configuration in which the dog clutch teeth 41, 43 mesh with each other when the second movable member 42 moves to increase the fitting amount of the second movable member 42 and the third cylindrical section 40. The Hi clutch mechanism Hi/C may be configured such that the dog clutch teeth 41, 43 are disengaged from each other when the second movable member 42 moves to increase the fitting amount of the second movable member 42 and the third cylindrical section 40, and that the dog clutch teeth 41, 43 mesh with each other when the second movable member 42 moves to reduce the fitting amount of the second movable member 42 and the third cylindrical section 40.

Moreover, the actuators configured to control the clutch mechanisms Lo/C, Hi/C are not limited to the electromagnetic actuators, and may be hydraulic actuators. In addition, each of the actuators does not necessarily need to be attached to the outside of the case, and may be attached to an inner surface of the case.

What is claimed is:

1. A power transmission apparatus comprising:
    a first meshing engagement mechanism that selectively couples a first rotational section and a second rotational section; and
    a second meshing engagement mechanism that selectively couples a third rotational section and a fourth rotational section, wherein:
    the first rotational section has a cylindrical shape;
    the second rotational section is disposed concentrically with the first rotational section and has a cylindrical shape having a diameter larger than a diameter of the first rotational section;
    the third rotational section is disposed concentrically with the second rotational section and has a cylindrical shape having a diameter larger than the diameter of the second rotational section;
    the fourth rotational section is disposed concentrically with the third rotational section and has a cylindrical shape having a diameter larger than the diameter of the third rotational section;
    first meshing teeth are provided on one of the first rotational section and the second rotational section;
    second meshing teeth are provided on one of the third rotational section and the fourth rotational section;
    the first meshing engagement mechanism includes a first movable member having a cylindrical shape, the first movable member is provided between the first rotational section and the second rotational section so as to be movable in a direction of a rotational axis of the first rotational section, and the first movable member is provided with third meshing teeth that mesh with the first meshing teeth at a time when the first movable member moves in the direction of the rotational axis,
    the second meshing engagement mechanism includes a second movable member having a cylindrical shape, the second movable member is provided between the third rotational section and the fourth rotational section so as to be movable in the direction of the rotational axis, and the second movable member is provided with fourth meshing teeth that mesh with the second meshing teeth at a time when the second movable member moves in the direction of the rotational axis; and
    at least a portion of a first movable region along the direction of the rotational axis and at least a portion of a second movable region along the direction of the rotational axis overlap with each other in a radial direction with respect to the rotational axis, the first movable region being a region where the third meshing teeth are movable due to movement of the first movable member, and the second movable region being a region where the fourth meshing teeth are movable due to movement of the second movable member.

2. The power transmission apparatus according to claim 1, wherein an entire region of one of the first movable region and the second movable region overlaps with the other of the first movable region and the second movable region in the radial direction with respect to the rotational axis.

3. The power transmission apparatus according to claim 1 further comprising:
    a first pressing section that is integrated with an outer peripheral surface at one end of the first movable member in an axial direction of the first movable member;
    a first actuator configured to apply an axial load to a lateral surface at an outer peripheral side of the first pressing section;
    a second pressing section that is integrated with an outer peripheral surface at one end of the second movable member in an axial direction of the second movable member; and
    a second actuator configured to apply an axial load to a lateral surface at an outer peripheral side of the second pressing section.

4. The power transmission apparatus according to claim 1, wherein
    the first movable member is coupled to the second rotational section such that the first movable member is rotated integrally with the second rotational section.

5. The power transmission apparatus according to claim 1, wherein the second movable member is coupled to the fourth rotational section such that the second movable member is rotated integrally with the fourth rotational section.

6. The power transmission apparatus according to claim 1, wherein:
    the first movable member is coupled to the second rotational section such that the first movable member is rotated integrally with the second rotational section;
    the second movable member is coupled to the third rotational section such that the second movable member is rotated integrally with the third rotational section;
    the first movable member and the first pressing section are coupled to each other such that the first movable member and the first pressing section are rotated integrally with each other;
    the second movable member and the second pressing section are coupled to each other such that the second movable member and the second pressing section are rotated integrally with each other;
    the first pressing section and the second pressing section are arranged in an axial direction of the first rotational section, and
    the second rotational section and the third rotational section are configured to rotate integrally with each other.

* * * * *